Nov. 28, 1950 M. G. CLAY 2,532,009
METHOD OF COOKING
Filed Feb. 4, 1947 3 Sheets-Sheet 1
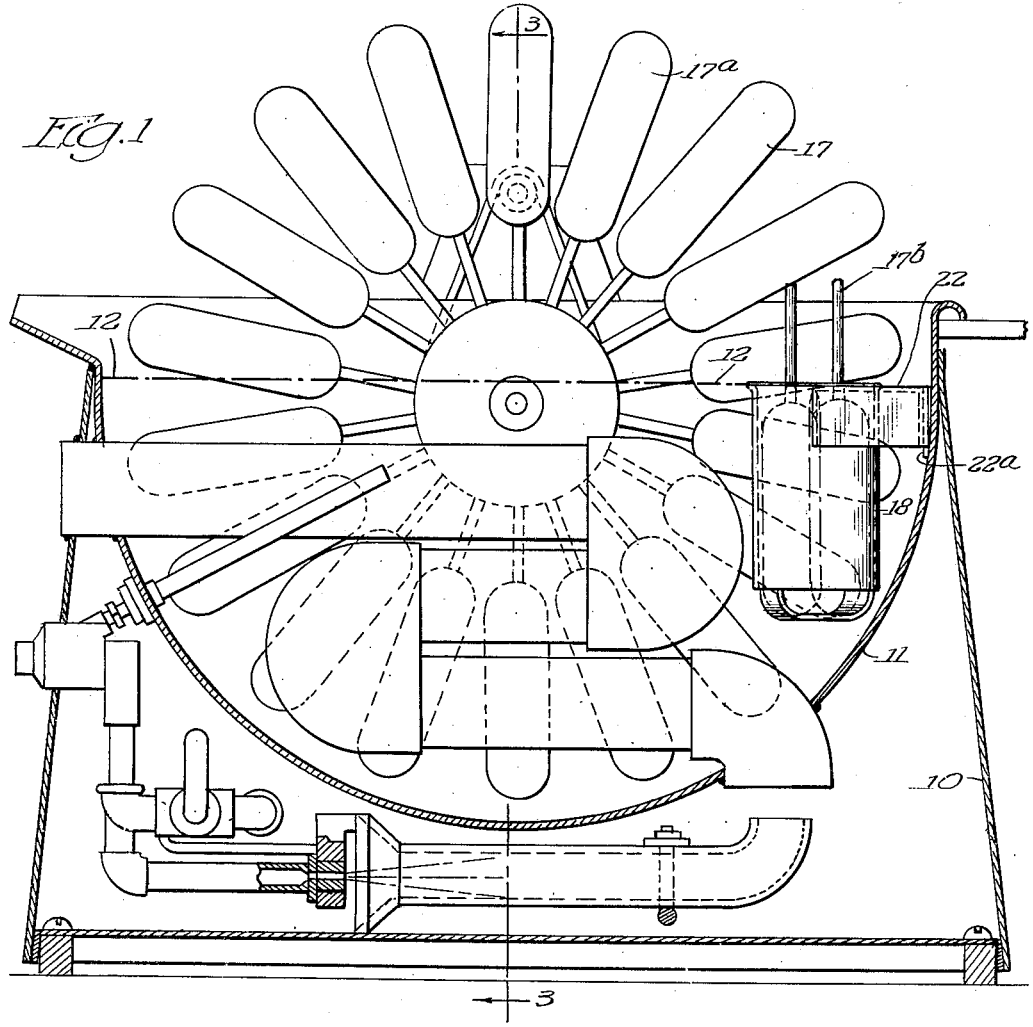
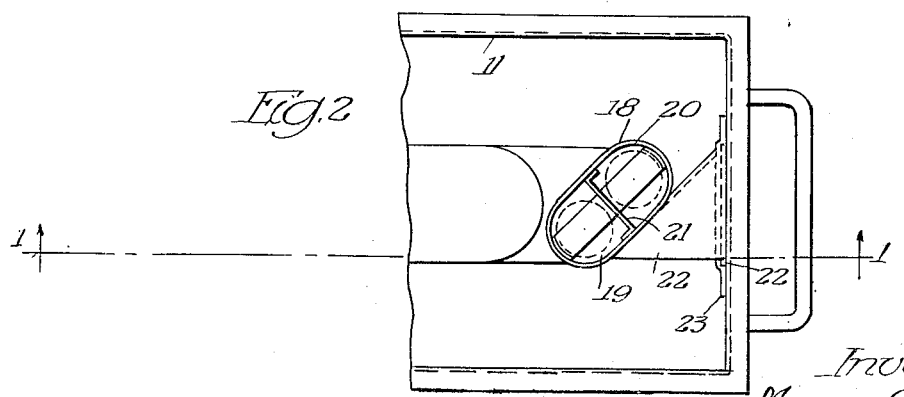
Inventor
Murray G. Clay Nov. 28, 1950 M. G. CLAY 2,532,009
METHOD OF COOKING
Filed Feb. 4, 1947 3 Sheets-Sheet 2
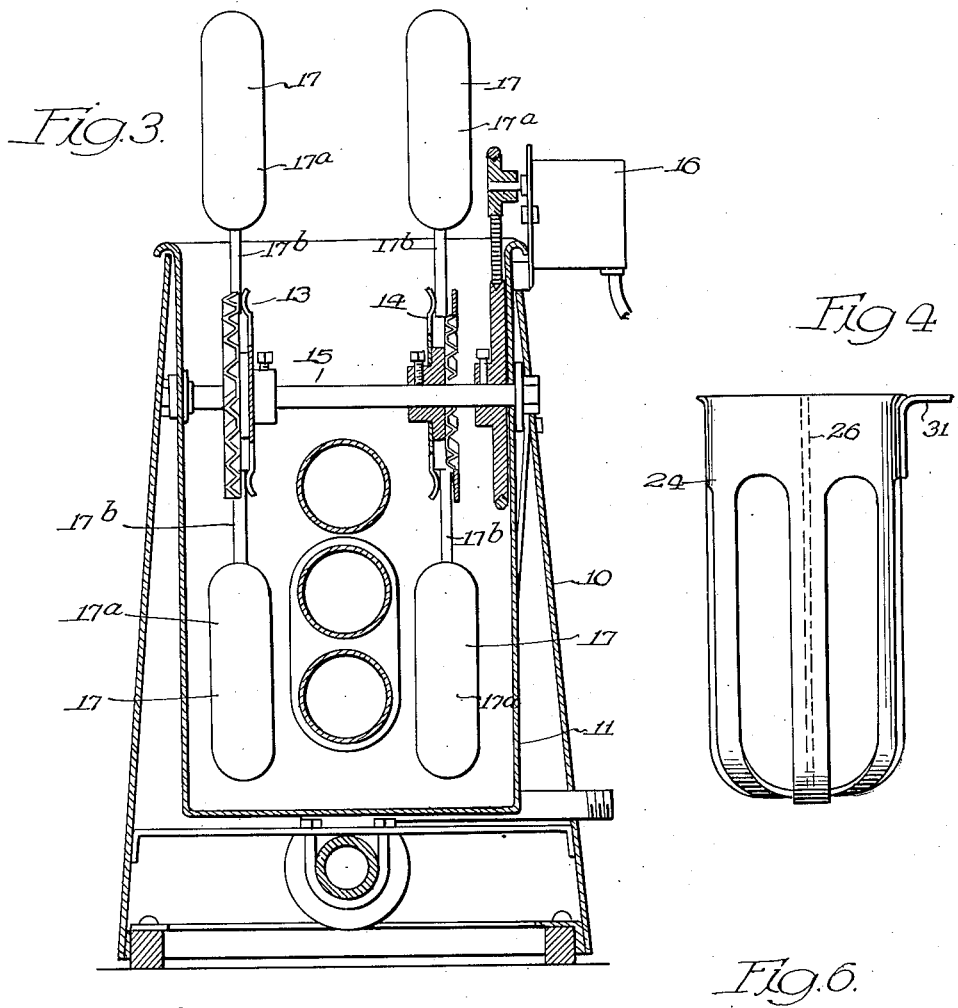
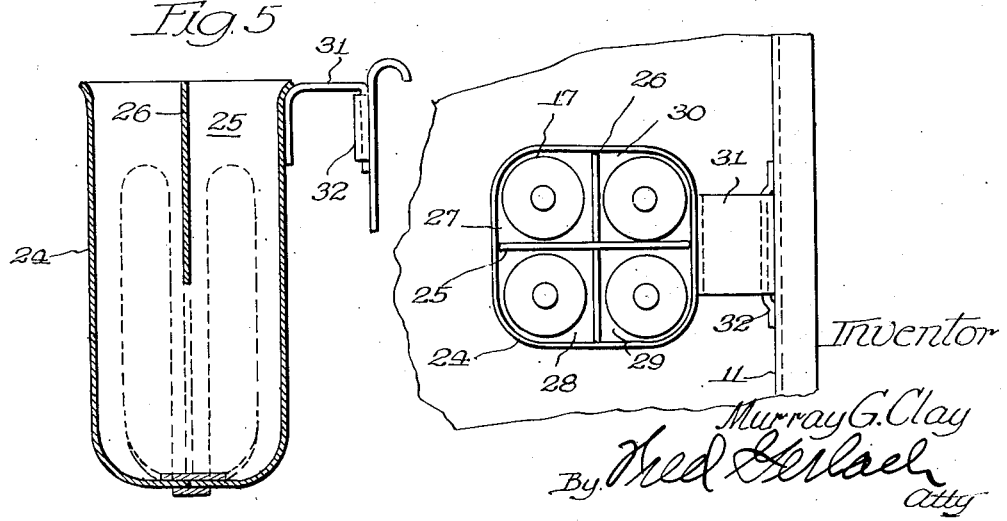
Inventor
Murray G. Clay
By Fred Gerlach
Atty

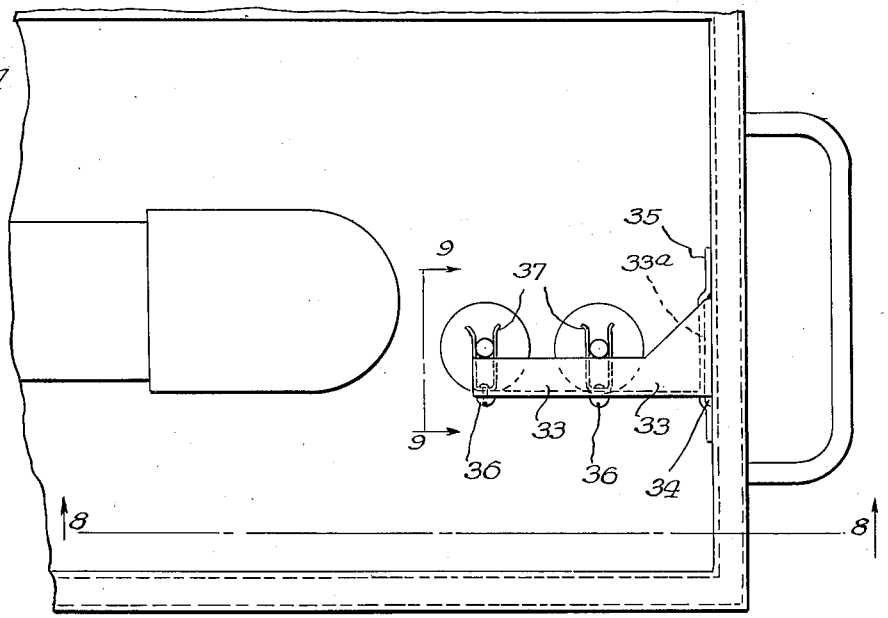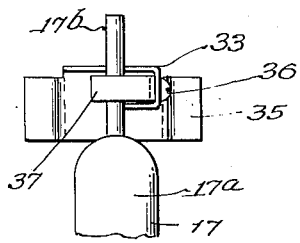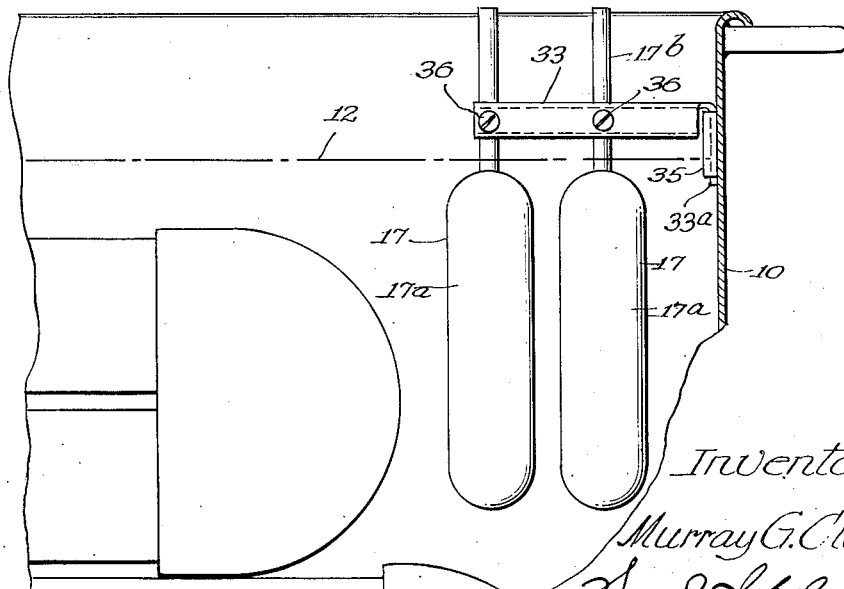

Patented Nov. 28, 1950

2,532,009

UNITED STATES PATENT OFFICE 2,532,009

METHOD OF COOKING

Murray G. Clay, River Forest, Ill.

Application February 4, 1947, Serial No. 726,305

1 Claim. (Cl. 99—107)

This invention relates to improvements in cooking methods and to continuous cookers of the kind described and claimed in my co-pending application, Serial No. 703,849, filed October 17, 1946.

The subject matter of my aforementioned application is a machine designed to facilitate the cooking of a comestible comprising a wiener impaled on a wooden skewer and coated with an edible batter, which batter must be seared, in order to render it non-fluid, before the comestible is attached to one of the rotors which slowly moves it through a pool of hot cooking fat.

Heretofore, the practice has been to dip the batter-coated wiener in the hot fat and hold the same manually long enough to set the batter and then attach the comestible by means of its skewer to the periphery of the revolving rotor. Such practice is effective but inconvenient for the reason that the operator has not only to attend the machine but also to wait upon customers.

I have discovered that the procedure which comprises both operating the machine and waiting on customers contemporaneously can be greatly facilitated and speeded up through the provision of means for removably supporting the batter-coated comestibles in the hot fat during the searing period so that the operator is not obliged to occupy himself with the job of holding the comestible manually and can, for that reason, devote his attention, when necessary, to waiting on customers without undue interruption.

It may be stated that the primary object of this invention is to render more facile the operation of a continuous cooker of the type described in my aforementioned co-pending application.

Another object is to add to the comfort of the operator in that he is not required to hold his hand for an extended period over the hot cooking fat while the comestible is cooking.

A further object is to improve the ability of the machine operator to simultaneously attend the machine and wait on customers so as to keep the machine continuously fed with uncooked comestibles and at the same time keep the customers moving in a more or less steady stream.

My invention resides both in the added facilities for detachably holding the comestibles during the searing periods and in the improved method of operation hereinafter described.

Referring to the drawings which accompany this specification:

Fig. 1 is a vertical sectional view taken along line 1—1 of Fig. 2, showing a continuous cooker according to my aforementioned application, to which has been added means for detachably supporting in the cooking fat two batter-coated skewered wieners;

Fig. 2 is a fragmentary plan view of the same;

Fig. 3 is a vertical section taken at line 3—3 of Fig. 1;

Fig. 4 is an elevational view of a cup-like supporting receptacle for batter-coated wieners—being an alternative to that shown in Figs. 1 and 2;

Fig. 5 is a vertical sectional view of the receptacle shown in Fig. 4;

Fig. 6 is a top plan view of the same;

Fig. 7 is another fragmentary plan view similar to Fig. 2 but showing a different type of support for the batter-coated wieners;

Fig. 8 is a fragmentary vertical sectional view taken at line 8—8 of Fig. 7; and Fig. 9 is a detail view taken at line 9—9 of Fig. 7.

For the purposes of the present case it is thought sufficient, so far as the cooker as a whole is concerned, to state that it comprises a supporting structure 10 on which is mounted a semi-circular receptacle or kettle 11 which is kept filled with liquid cooking fat up to about the level indicated by broken line 12 in Fig. 1. Means, shown in Figs. 1 and 3, are provided for heating the cooking fat and regulating the temperature thereof. A pair of rotors 13 and 14 are mounted on a continuously rotating shaft 15, which is belt driven by a motor 16 at a very low speed; and the comestibles 17, each comprising a batter-coated wiener 17a and a wooden skewer 17b are detachably supported by said rotors and project radially therefrom. As shown, each rotor is adapted to receive a maximum of eighteen comestibles, and as each of these passes through the hot fat it is thoroughly cooked and is ready to be removed and eaten when it emerges from the fat.

The operator impales each wiener on a skewer, then dips the wiener into the batter, sears the batter coating by dipping the wiener in the hot fat, so as to render the batter non-fluid, and then attaches the seared comestible by its skewer to one of the rotors.

Heretofore it has been the practice for the operator to hold each wiener manually, with the wiener immersed in the hot fat, during the searing step, and this has not only been unpleasant, because of the heat from the cooking fat, but has often impeded him in his duty of attending to customers.

My present invention consists in the provision of suitable means for supporting the comestible, with the coated wiener immersed in the hot fat, during the searing period; and the provision which I have shown to that end in Figs. 1 and 2 comprises a cup-like receptacle 18 having two cavities 19 and 20 separated by a partition 21—each of said cavities being large enough to receive one coated wiener, but small enough to support the wiener in substantially vertical posture—the skewers 17b projecting upwardly above the level of the hot fat so that they do not become immersed in the fat. The receptacle 18 supports the comestibles at their lower ends and is provided with openings to permit access of hot fat to the interior of the two cavities 19 and 20 so that the wieners are fully immersed in fat.

A sheet metal arm 22 is welded to receptacle 18 and has a vertical leg 22a (see Fig. 1) which is adapted to be inserted in a slot formed by a bent strap 23 which is welded or otherwise secured to the inside surface of kettle 11 and functions as a supporting bracket for the receptacle.

The receptacle 18, together with arm 22, can easily be lifted out of engagement with strap 23 and thus removed from the kettle for cleaning. The outer surface of the batter becomes firm immediately upon contact with the hot fat so that no damage is done to the coating upon coming into contact with receptacle 18.

A modified version of receptacle 18 is shown in Figs. 4-6 inclusive, and in this case provision is made for the reception of four comestibles instead of two. Here, the receptacle 24 has partitions 25 and 26 dividing its interior into four identical cavities 27-30 inclusive, each of which is adapted to receive one comestible 17.

An arm 31, corresponding in function to arm 22 of Figs. 1 and 2, is welded to receptacle 24 and detachably secured to kettle 11 by means of a strap 32 which may be identical with previously described strap 23.

The wet batter coating contains enough water to cause the wieners to sink to the bottom of their supporting receptacles, but the entrained water vaporizes and escapes from the batter coincidentally with the setting of the batter and this results in a sufficient weight reduction to cause the comestibles to float, and the consequent rise in elevation of the skewers serves to inform the operator that the comestibles are ready to be removed from the receptacles and attached to one of the rotors.

Still another device for supporting the comestibles during the searing periods is shown in Figs. 7-9 and comprises a bracket 33 of sheet metal having a U-shaped or channel cross section as viewed in Fig. 9. Bracket 33 is widened at the end adjacent the kettle wall and has a vertical leg 33a which is adapted to be removably inserted in a slot 34 between bent strap 35 and the kettle wall to which said strap is welded. Attached to the U-shaped portion of bracket 33 by means of screws 36 or other suitable fasteners are two hairpin shaped spring clips 37, each of which is adapted to grip a skewer 17b and thus hold the comestibles in depending posture with the coated wieners immersed in the hot fat.

It will, of course, be understood that there are various possible modifications and alternatives within the scope and purview of my invention and, accordingly, I do not wish to be limited except as clearly indicated by the terms of the appended claim.

Having described my invention, what I claim as new and wish to secure by Letters Patent is:

The method of cooking a comestible comprising a wiener impaled end-to-end on a skewer and having a water-containing batter coating, which method comprises placing the batter-coated wiener in a pool of hot fat with the skewer thereof projecting upwardly out of the pool, retaining the coated wiener stationarily in the pool of hot fat until it floats therein as a result of increased buoyancy due to vaporization and consequent removal of a portion of the water content of the batter coating, then continuously conveying the coated wiener through the hot fat for a predetermined period of time of sufficient duration to complete the cooking of the wiener, and thereupon withdrawing the wiener from the hot fat.

MURRAY G. CLAY.

REFERENCES CITED

The following references are of record in the file of this patent:

UNITED STATES PATENTS

| Number | Name | Date |
| --- | --- | --- |
| 1,706,491 | Jenkins | Mar. 26, 1929 |
| 1,993,609 | Kennedy | Mar. 5, 1935 |